(12) United States Patent
Agashe et al.

(10) Patent No.: US 7,072,628 B2
(45) Date of Patent: Jul. 4, 2006

(54) METHOD AND APPARATUS FOR DETERMINING RECEIVE DIVERSITY IN MOBILE STATION

(75) Inventors: Parag A. Agashe, San Diego, CA (US); Peter J. Black, San Diego, CA (US); Roberto Padovani, San Diego, CA (US)

(73) Assignee: QUALCOMM, Incorporated, San Diego, CA (US)

( * ) Notice: Subject to any disclaimer, the term of this patent is extended or adjusted under 35 U.S.C. 154(b) by 468 days.

(21) Appl. No.: 10/117,893

(22) Filed: Apr. 5, 2002

(65) Prior Publication Data

US 2003/0190924 A1 Oct. 9, 2003

(51) Int. Cl.
*H04B 7/08* (2006.01)

(52) U.S. Cl. ............ 455/140; 455/137; 455/273; 375/267

(58) Field of Classification Search ........ 455/132–141, 455/272–275, 276.1, 277.1, 2, 103, 69, 442; 375/267

See application file for complete search history.

(56) References Cited

U.S. PATENT DOCUMENTS 6,678,508 B1 * 1/2004 Koilpillai et al. ............ 455/137
6,724,828 B1 * 4/2004 Dabak ......................... 375/267

FOREIGN PATENT DOCUMENTS

WO 01/59945 A1 8/2001

* cited by examiner

*Primary Examiner*—Nay Maung
*Assistant Examiner*—Philip J. Sobutka (74) *Attorney, Agent, or Firm*—Philip Wadsworth; Sandra L. Godsey; S. Hossain Beladi (57) ABSTRACT

For determining use of receive diversity in a mobile station, a control system (210 or 401) determines a demand level for use of communication resources. A transmitter (300) communicates a message indicating use of receive diversity at a mobile station based on the determined demand level. In another aspect, a receiver (200) receives a channel and determines transmit power level of the channel for being at a lower or upper transmit power level limit. The control system (210 or 401) controls receive diversity by selecting a number of receiver chains (290) based on the determined transmit power level. In another aspect, receiver (200) receives a channel and determines a channel condition of the channel and duration of the channel condition. Control system (210 or 401) controls receive diversity by selecting a number of receiver chains (290) based on the determined channel condition and the duration.

23 Claims, 7 Drawing Sheets

METHOD AND APPARATUS FOR DETERMINING RECEIVE DIVERSITY IN MOBILE STATION

FIELD

The present invention relates generally to the field of communications, and more specifically, to communications using a receive diversity technique.

BACKGROUND

The communication channel between a transmitter and a receiver is susceptible to noise, interference, and multipath. Multiple antennas may be used at the receiving destination to enhance the received signal. A receiver chain for signals received at each antenna may be necessary. Therefore, multiple receiver chains may be necessary to exploit the signals received at multiple receive antennas. Use of multiple receiver chains increases the power consumption. A mobile station in a communication system may greatly benefit from receive diversity; however, mobile stations generally have limited battery power supply.

In another aspect, transmit power level of a signal targeted for a mobile station may be at a lower level when the mobile station is using receive diversity. Processing a received channel may be accomplished using receive diversity by combining the received signals. When the signals are combined at the receiver, the effective carrier to noise ratio of the channel may be increased to a level above the minimum level required for processing the channel. As a result, the transmitter may transmit the signal at a lower power level without effecting the receive processing. As such, the transmitter may be able to transmit to a larger number of mobile stations. Use of receiver diversity at the mobile station thus increases the capacity of the communication system; however, use of receiver diversity increases the power consumption at the mobile station.

Performance of mobile stations, in at least one aspect, is measured with respect to the length of time operating without recharging the battery power supply. To benefit from the receive diversity, the receiver may have to turn on multiple receiver chains to process multiple received signals. As a result, the receiver may consume a substantial amount of battery power. Therefore, use of receive diversity without any rules for decoding a received channel may adversely effect the battery life of the mobile station.

To this end as well as others, there is a need for an effective use of receiver diversity for decoding various channels in a communication system.

SUMMARY

Method and apparatus for determining use of receive diversity in a mobile station are disclosed. In one aspect, a control system determines a demand level for use of communication resources in a communication system. A transmitter communicates a message indicating use of receive diversity at a mobile station based on the determined demand level. In another aspect, a receiver receives a channel and determines transmit power level of the channel for being at a lower or upper transmit power level limit. A control system controls receive diversity of receiver by selecting a number of receiver chains based on the determined transmit power level. In another aspect, the receiver receives a channel and determines a channel condition of the channel and duration of the channel condition. The control system controls receive diversity of receiver by selecting a number of receiver chains based on the determined channel condition and the duration. Determining the channel condition and its duration may be based on a comparison of various thresholds, as communicated by the base station to the mobile station. The thresholds may include a disable-receive-diversity threshold, a receive-diversity-disable period threshold, an enable-receive-diversity threshold and a receive-diversity-enable period threshold.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENT(S)

Various embodiments of the invention may be incorporated in a wireless communication system operating in accordance with the code division multiple access (CDMA) technique which has been disclosed and described in various standards published by the Telecommunication Industry Association (TIA) and other standards organizations. Such standards include the TIA/EIA-95 standard, TIA/EIA-IS-2000 standard, IMT-2000 standard, UMTS and WCDMA standard, all incorporated by reference herein. A system for communication of data is also detailed in the "TIA/EIA/IS-856 cdma2000 High Rate Packet Data Air Interface Specification," incorporated by reference herein. A copy of the standards may be obtained by accessing the world wide web at the address: http://www.3gpp2.org, or by writing to TIA, Standards and Technology Department, 2500 Wilson Boulevard, Arlington, Va. 22201, United States of America. The standard generally identified as UMTS standard, incorporated by reference herein, may be obtained by contacting 3GPP Support Office, 650 Route des Lucioles-Sophia Antipolis, Valbonne-France.

Generally stated, various aspects of the invention provide for efficient use of communication resources in a CDMA communication system. In accordance with at least one aspect of the invention, various conditions for using receive diversity are determined. The use of receive diversity is determined, most likely, for conditions that produces its beneficial features, such as system capacity to accommodate more users and preventing erroneous decoding of the received data, while minimizing the impact on battery life of the mobile station.

One or more exemplary embodiments described herein are set forth in the context of a digital wireless communication system. While use within this context is advantageous, different embodiments of the invention may be incorporated in different environments or configurations. In general, the various systems described herein may be formed using software-controlled processors, integrated circuits, or discrete logic. The data, instructions, commands, information, signals, symbols, and chips that may be referenced throughout the application are advantageously represented by voltages, currents, electromagnetic waves, magnetic fields or particles, optical fields or particles, or a combination thereof. In addition, the blocks shown in each block diagram may represent hardware or method steps.

Figure 1:
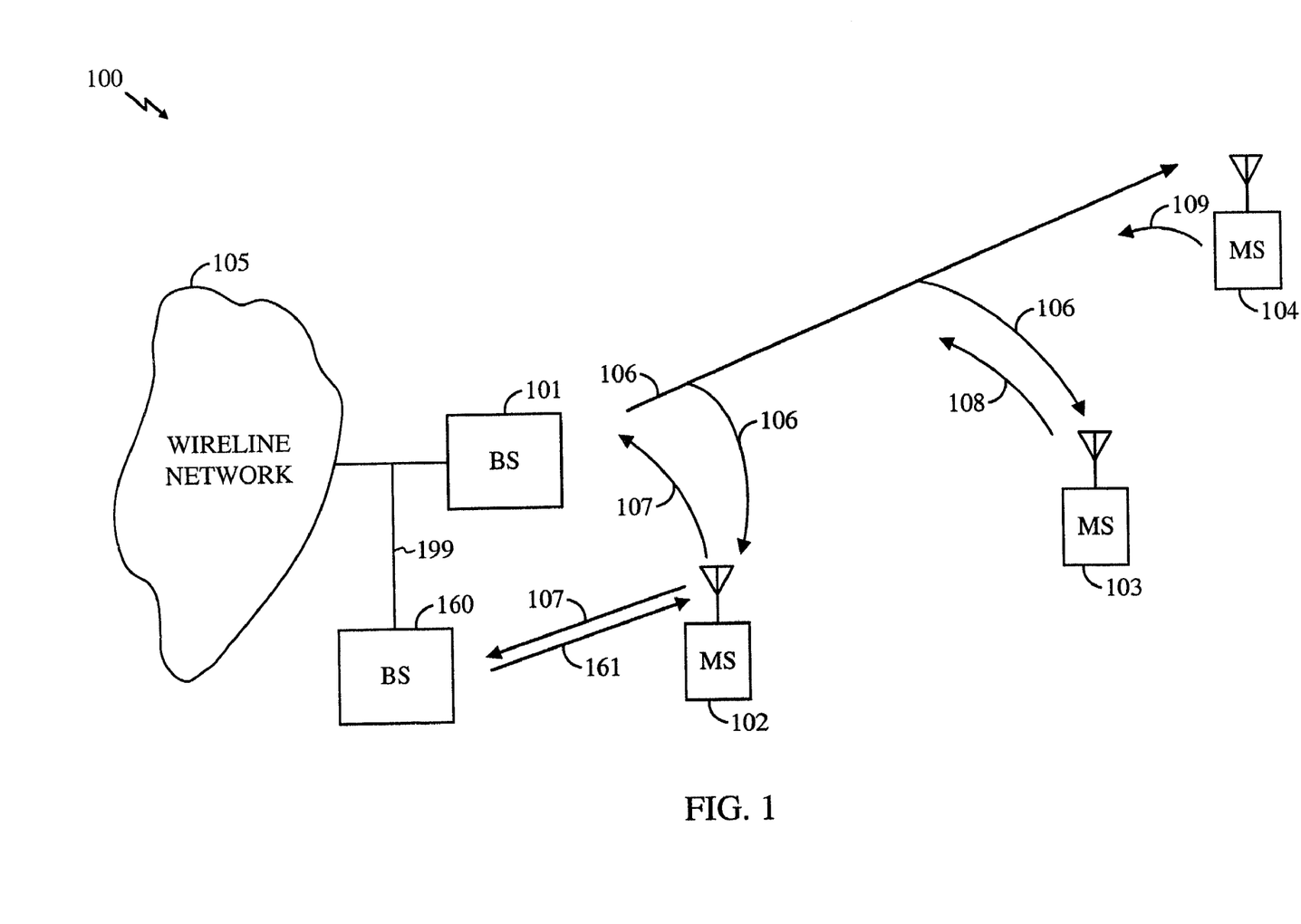
FIG. 1 depicts a communication system capable of operating in accordance with various embodiments of the invention.

FIG. 1 illustrates a general block diagram of a communication system 100 capable of operating in accordance with any of the code division multiple access (CDMA) communication system standards while incorporating various embodiments of the invention. Communication system 100 may be for communications of voice, data or both. Generally, communication system 100 includes a base station 101 that provides communication links between a number of mobile stations, such as mobile stations 102–104, and between the mobile stations 102–104 and a public switch telephone and data network 105. The mobile stations in FIG. 1 may be referred to as data access terminals (AT) and the base station as data access network (AN) without departing from the main scope and various advantages of the invention. Base station 101 may include a number of components, such as a base station controller and a base transceiver system. For simplicity, such components are not shown. Base station 101 may be in communication with other base stations, for example base station 160. A mobile switching center (not shown) may control various operating aspects of the communication system 100 and in relation to a back-haul 199 between network 105 and base stations 101 and 160.

Base station 101 communicates with each mobile station that is in its coverage area via a forward link signal transmitted from base station 101. The forward link signals targeted for mobile stations 102–104 may be summed to form a forward link signal 106. Each of the mobile stations 102–104 receiving forward link signal 106 decodes the forward link signal 106 to extract the information that is targeted for its user. Base station 160 may also communicate with the mobile stations that are in its coverage area via a forward link signal transmitted from base station 160. Mobile stations 102–104 communicate with base stations 101 and 160 via corresponding reverse links. Each reverse link is maintained by a reverse link signal, such as reverse link signals 107–109 for respectively mobile stations 102–104. The reverse link signals 107–109, although may be targeted for one base station, may be received at other base stations.

Base stations 101 and 160 may be simultaneously communicating to a common mobile station. For example, mobile station 102 may be in close proximity of base stations 101 and 160, which can maintain communications with both base stations 101 and 160. On the forward link, base station 101 transmits on forward link signal 106, and base station 160 on the forward link signal 161. On the reverse link, mobile station 102 transmits on reverse link signal 107 to be received by both base stations 101 and 160. For transmitting a packet of data to mobile station 102, one of the base stations 101 and 160 may be selected to transmit the packet of data to mobile station 102. On the reverse link, both base stations 101 and 160 may attempt to decode the traffic data transmission from the mobile station 102.

The communication system 100 may also employ use of pilot channels for proper decoding of various channels. A pilot channel contains a series of predefined data. A receiver receives the pilot channel to determine various characteristics of the propagation channel. One of the characteristics may be a carrier to interference ratio (Ec/Io) of the pilot channel. The pilot channel may be used to decode other received channels. The forward and reverse links may have pilot channels. On the forward link, a base station may transmit a pilot channel for all the mobile stations in its coverage area. On the reverse link, each mobile station may combine the reverse link channels with a pilot channel.

Figure 2:
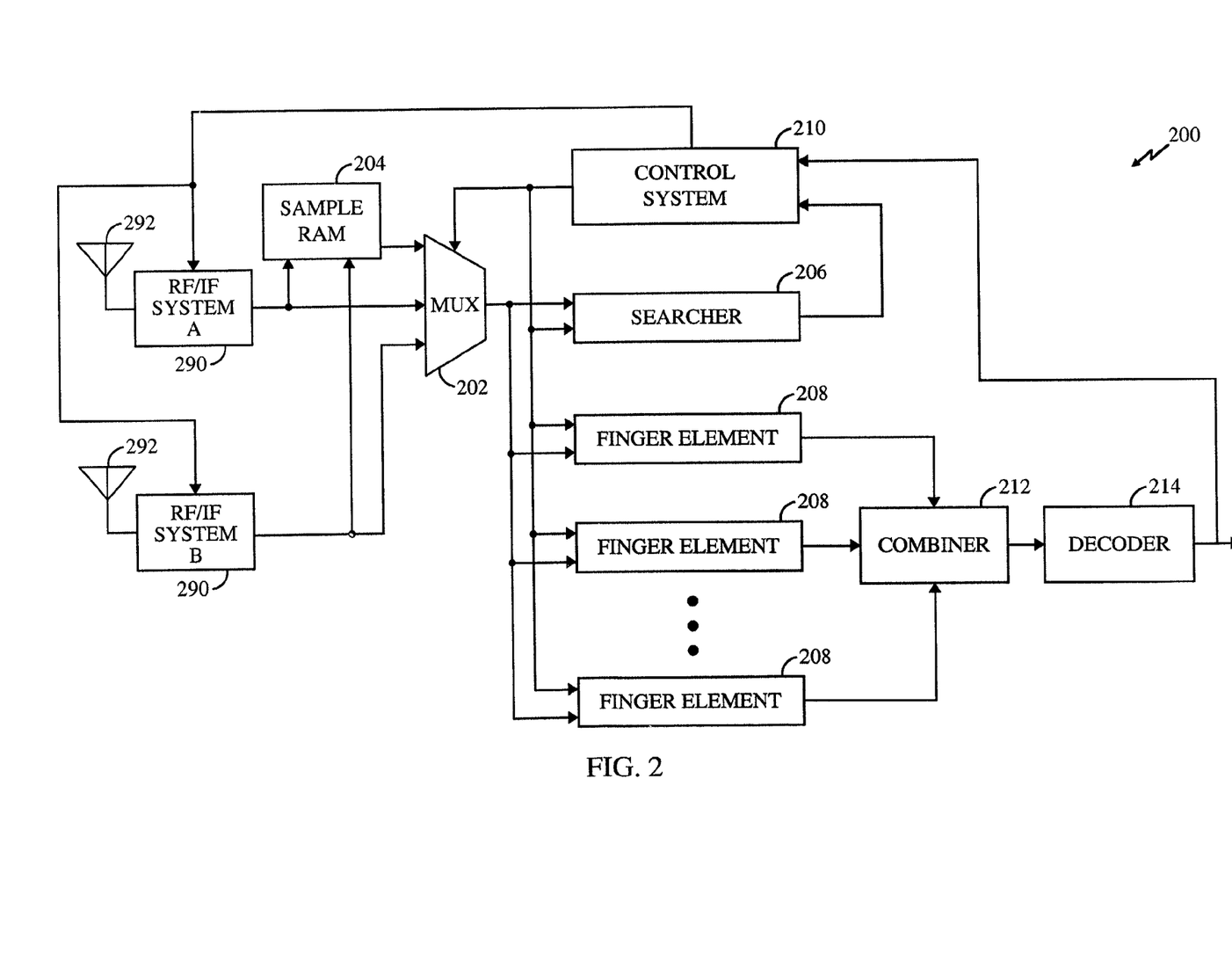
FIG. 2 depicts a communication system receiver for receiving and decoding received data in accordance with various aspects of the invention.

FIG. 2 illustrates a block diagram of a receiver 200 used for processing and demodulating the received CDMA signal in accordance with various aspects of the invention. Receiver 200 may be used for decoding the information on the reverse and forward links signals. Received (Rx) samples may be stored in RAM 204. Receive samples are generated by a radio frequency/intermediate frequency (RF/IF) system 290 and an antenna system 292. The RF/IF system 290 and antenna system 292 may include one or more components for receiving multiple signals and RF/IF processing of the received signals for taking advantage of the receive diversity gain. For example, RF/IF system 290 may include the RF/IF systems 290A and 290B, each being considered a receiver chain. More than two receiver chains may also be used. Each element of antenna system 292 receives an RF signal, and passes the received RF signal to a receiver chain in the RF/IF system 290. RF/IF system 290 may be any conventional RF/IF receiver. The RF/IF system 290 may be a "zero" intermediate frequency (ZIF) receiver. The received RF signals are filtered, down-converted and digitized to form RX samples at base band frequencies. The samples are supplied to a demultiplexer (demux) 202. The output of demux 202 is supplied to a searcher unit 206 and finger elements 208. A control system 210 is coupled thereto. A combiner 212 couples a decoder 214 to finger elements 208. Control system 210 may be a microprocessor controlled by software, and may be located on the same integrated circuit or on a separate integrated circuit. The decoding function in decoder 214 may be in accordance with a turbo decoder or any other suitable decoding algorithms.

During operation, received samples are supplied to demux 202. Demux 202 supplies the samples to searcher unit 206 and finger elements 208. Control system 210 configures finger elements 208 to perform demodulation and despreading of the received signal at different time offsets based on search results from searcher unit 206. Despreading of the channels is performed by multiplying the received samples with the complex conjugate of the PN sequence and assigned Walsh function at a single timing hypothesis and digitally filtering the resulting samples, often with an integrate and dump accumulator circuit (not shown). Such a technique is commonly known in the art. The searcher 206 may decode the pilot channel to determine the channel condition, such as determining Ec/Io. If the Ec/Io of the pilot channel of the transmitting source is above a threshold, the control system 210 may decide to assign finger elements 208 to process other received channels from the same source. In the mobile station, various lists of base stations with adequate pilot channel Ec/Io are kept. The lists may include an active list of base stations, a candidate list of base stations, a neighboring list of base stations and a remaining list of base stations. The lists of the base stations may be organized in accordance with the received Ec/Io level. The base stations in the active list have the strongest received Ec/Io.

In accordance with various aspects of the invention, control system 210 controls the number of receiver chains used for processing the received channels based on the received channel condition, frame error rate or packet error rate, transmit power level of the channel at a transmitting base station, demand level for use of communication resources in the communication system 100, or any combination thereof. Control system 210 controls the number of receiver chains used in the RF/IF system 290. The scale of the receive diversity may be related to the number of selected receiver chains. Large scale receive diversity may refer to using a large number of receiver chains. When no receive diversity is used, only one receiver chain may be used. For example, when four receiver chains are available, the receive diversity scale may range from using 1 to 4 receiver chains. Therefore, receiver 200 operates its receive diversity based on at least one of the received channel condition, frame error rate (FER) or packet error rate, transmit power level of the channel at a transmitting base station, demand level for use of communication resources in the communication system 100, and any combination thereof. The receiver 200 may be incorporated in a mobile station and configured for use in the communication system 100.

Figure 3:
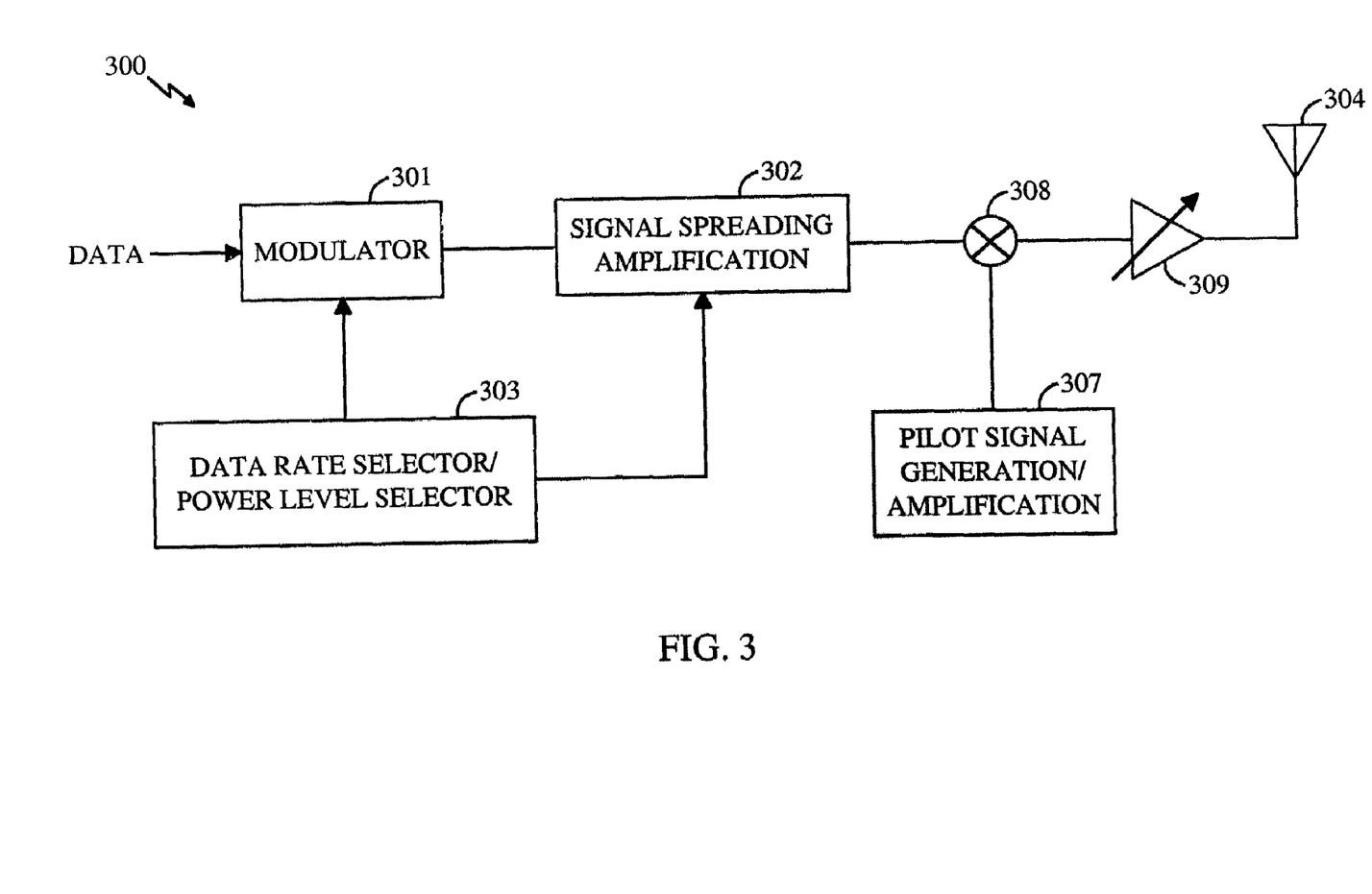
FIG. 3 depicts a communication system transmitter for transmitting data packets in accordance with various aspects of the invention.

For receive diversity, multiple received signals may be combined in accordance with any of the commonly known combining processes, such as maximal-ratio combining (MRC) and minimum mean-squared error (MMSE). Temporal combining, spatial combining, or a combination of both, may be used for the combining process. In temporal combining, the signals received through different propagation paths are combined. In the spatial combining, the signals received at different antennas and propagated through the same path are combined. In receiver 200, the results of the demodulation are combined in accordance with the receive diversity process, and passed the combined result to decoder 214. Decoder 214 decodes the data and outputs the decoded data. Receiver 200 may be used in a receiver portion of base stations 101 and 160 for processing the received reverse link signals from the mobile stations, and in a receiver portion of any of the mobile stations for processing the received forward link signals. The performance of the received channel, such as frame or packet error rate, may be communicated from decoder 214 to control system 210 for controlling receive diversity in receiver 200, in accordance with various aspects of the invention FIG. 3 illustrates a block diagram of a transmitter 300 for transmitting the reverse and forward link signals. The channel data for transmission are input to a modulator 301 for modulation. The modulation may be according to any of the commonly known modulation techniques such as QAM, PSK or BPSK. The data is encoded at a data rate in modulator 301. The data rate may be selected by a data rate and power level selector 303. The data rate selection may be based on feedback information received from a receiving destination. The receiving destination may be a mobile station or a base station. The feedback information may include the maximum allowed data rate. The maximum allowed data rate may be determined in accordance with various commonly known algorithms. The maximum allowed data rate very often is based on the channel condition, among other considered factors. The data rate and power level selector 303 accordingly selects the data rate in modulator 301. The output of modulator 301 passes through a signal spreading operation and amplified in a block 302 for transmission from an antenna 304. The data rate and power level selector 303 also selects a power level for the amplification level of the transmitted signal in accordance with the feedback information. The combination of the selected data rate and the power level allows proper decoding of the transmitted data at the receiving destination. The transmit power level may be limited within a predefined range. The transmit power range may have a lower limit and an upper limit. The lower limit of the transmit power range may be based on the rate at which the feedback information can cause the power to increase if the channel suddenly became worse. The upper transmit power limit may be based on the maximum amount of power resource that the transmitter is willing to allocate to a single receiver.

A pilot signal is also generated in a block 307. The pilot signal is amplified to an appropriate level in block 307. The pilot signal power level may be in accordance with the channel condition at the receiving destination. The pilot signal is combined with the channel signal in a combiner 308. The combined signal may be amplified in an amplifier 309 and transmitted from antenna 304. The antenna 304 may be in any number of combinations including antenna arrays and multiple input multiple output configurations.

Figure 4:
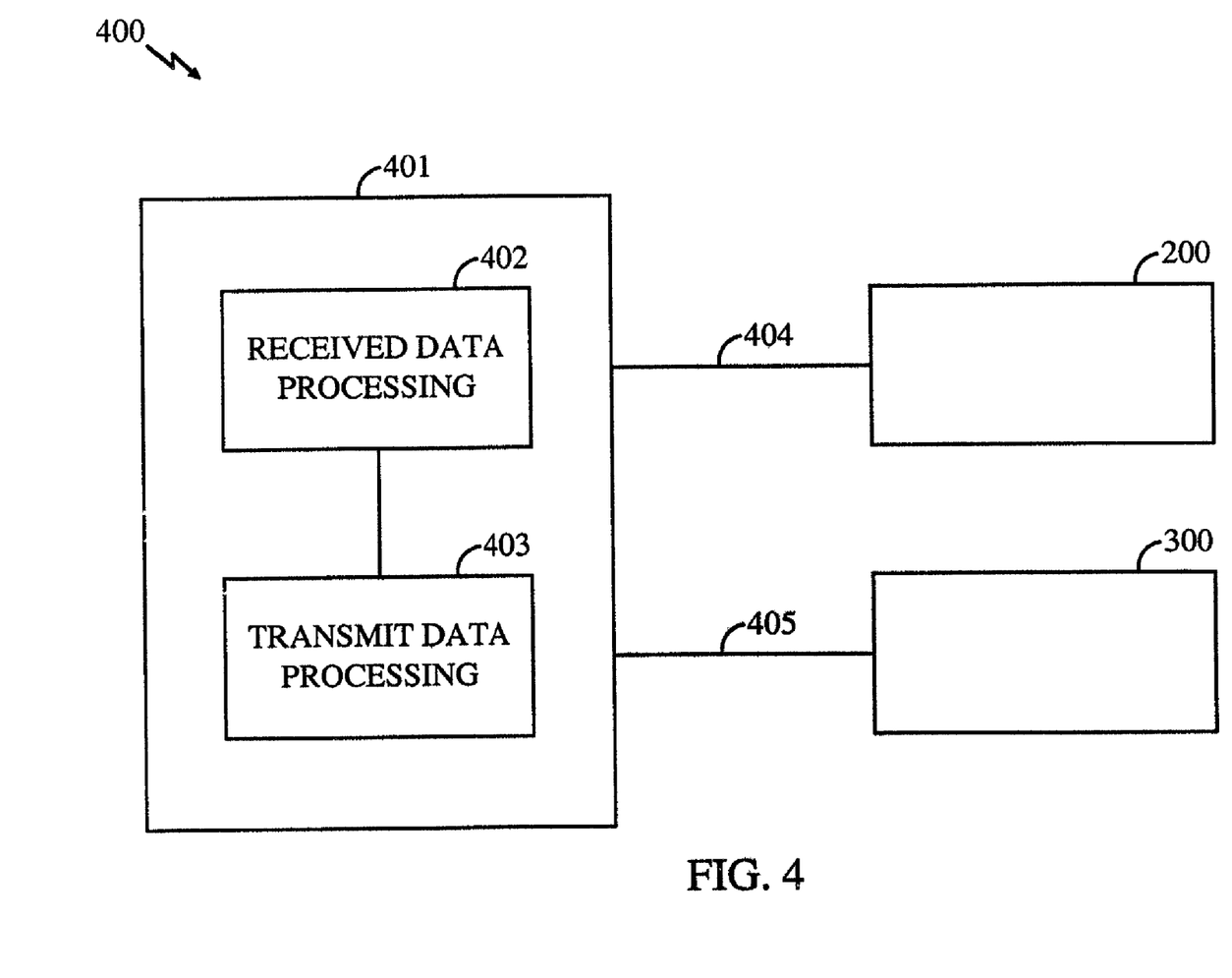
FIG. 4 depicts a transceiver system capable of operating in accordance with various embodiments of the invention.

FIG. 4 depicts a general block diagram of a transceiver system 400 for incorporating receiver 200 and transmitter 300 for maintaining a communication link with a destination. The transceiver 400 may be incorporated in a mobile station or a base station. A processor 401 may be coupled to receiver 200 and transmitter 300 to process the received and transmitted data. Various aspects of the receiver 200 and transmitter 300 may be common, even though receiver 200 and transmitter 300 are shown separately. In one aspect, receiver 200 and transmitter 300 may share a common local oscillator and a common antenna system for RF/IF receiving and transmitting.

On the transmitting side, transmit data processing block 403 prepares the data for transmission on a transmit channel. Transmitter 300 receives the data for transmission on input 405, and transmits the data from an antenna system. On the receiving side, after the received data are decoded, the decoded data are received at processor 400 at an input 404. Received data are processed in received data processing block 402 in processor 401. Various operations of processor 401 may be integrated in a single or multiple processing units. The transceiver 400 may be connected to another device. The transceiver 400 may be an integral part of the device. The device may be a computer or may operate similar to a computer. The device may be connected to a data network, such as Internet. In case of incorporating the transceiver 400 in a base station, the base station through several connections may be connected to a network, such as Internet.

Figure 5:
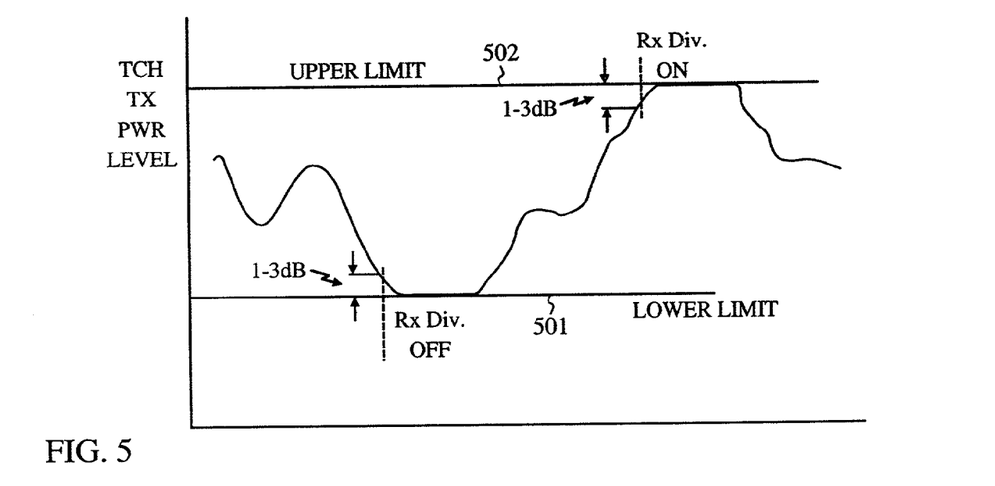
FIG. 5 illustrates comparison of the transmit power level to an upper and lower limits in accordance with various embodiments of the invention.

In accordance with various aspects of the invention, receive diversity in a communication system may be determined for a receiver, such as receiver 200, including a plurality of receiver chains, such as receiver chains 290. The receiver 200 receives a channel and determines transmit power level of the channel for being at a lower transmit power level limit 501 or an upper transmit power level limit 502, as shown in FIG. 5. The determination of the transmit power level may be based on a message sent from the transmitter to the receiver indicating the transmit power level. Alternately, the transmitter may explicitly control the scale of diversity used by the receiver by sending a message to the receiver. The determination of the transmit power level may also be based on the FER experienced by the receiver. For example, if the FER is much better than the target FER, the receiver may assume that the current transmit power level is at the lower limit. On the other hand, if the FER is much worse than the target FER, the receiver may assume that the transmit power is at the upper limit. A control system, such as control system 210 or a processor 401, through operation of received data processing unit 402, controls receive diversity of receiver 200 by selecting a number of the plurality of receiver chains 290 based on the determined transmit power level. The control system is configured for reducing the number of selected receiver chains when the determined transmit power level is at or below lower transmit power level limit 501. When the transmit power level is below the lower limit 501, the channel condition is very favorable; therefore, using receive diversity may not be necessary. If the receive diversity is used under this condition, the processing power and the power consumption are unnecessarily used. The control system, moreover, is configured for increasing the number of selected receiver chains when the determined transmit power level is at or above an upper transmit power level limit 502. When the transmit power level is reaching its upper limit, the channel condition is not very favorable; therefore, use of receive diversity is very beneficial under such a condition. The determination of whether the transmit power level is below the lower limit 501 or at or above the upper limit 502 may be based on the closeness of the transmit power level to the respective transmit power limit. For example, if the transmit power level is within 1–3 dB of the lower transmit power limit 501, the determination of the transmit power level establishes that the transmit power level is below the lower transmit power limit 501. Similarly, for example, if the transmit power level is within 1–3 dB of the upper transmit power limit 502, the determination of the transmit power level establishes that the transmit power level is above the upper transmit power limit 502. The upper transmit power limit 502 corresponds to a higher allowed transmit power level than a transmit power level corresponding to the lower transmit power level limit 501, in accordance with various aspects of the invention.

Figure 6:
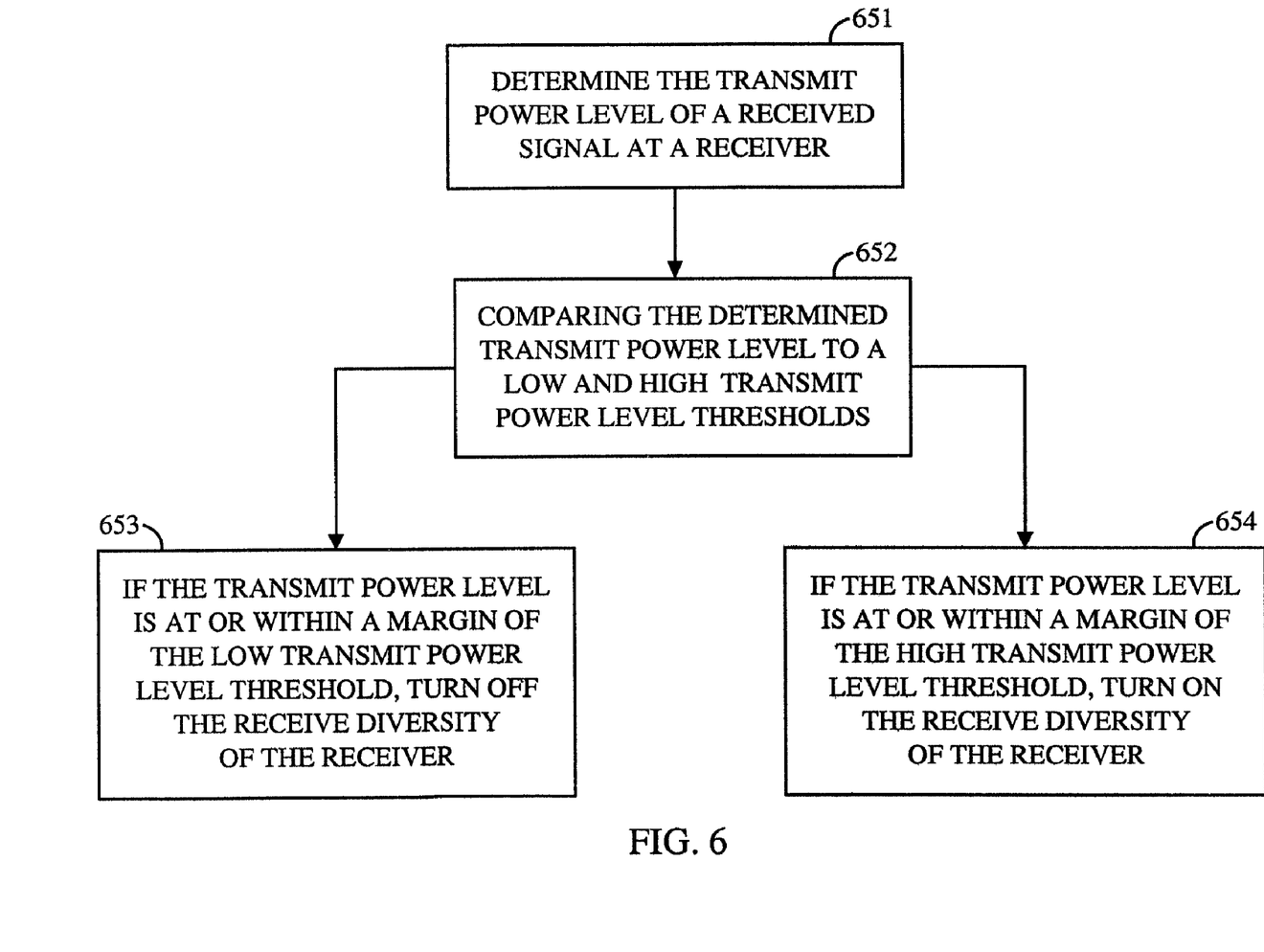
FIG. 6 illustrates a chart for comparison of the transmit power of a received channel to various thresholds in accordance with various embodiments of the invention.

Referring to FIG. 6, a flow chart for determining receive diversity based on the transmit power level in accordance with various aspects of the invention is shown. At step 651, control system 210 or processor 401 may determine the transmit power level of a received signal at the receiver 200. At step 652, the determined transmit power level is compared to a low and high transmit power level thresholds, 501 and 502 respectively. At step 653, if the transmit power level is at or within a margin of the low transmit power level limit 501, the control system 210 or processor 401 may turn off or scale back the receive diversity at the receiver 200. At step 654, if the transmit power level is at or within a margin of the high transmit power level limit 502, the control system 210 or processor 401 may turn on or increase the scale of the receive diversity at the receiver 200.

Furthermore, in accordance with various aspects of the invention, for determining receive diversity in a communication system, a receiver, such as receiver 200, including a plurality of receiver chains, such as receiver chains 290, receives a channel and determines a channel condition of the channel and duration of the channel condition. A control system, such as control system 210 or processor 401, controls receive diversity of the receiver by selecting a number of the plurality of receiver chains based on the determined channel condition and the duration of the determined channel condition. The control system is configured for reducing the number of selected receiver chains when the determined channel condition is above a disable-receive-diversity threshold 601 and the determined duration is longer than a receive-diversity-disable period threshold 602, shown in FIG. 7. The control system is configured for increasing the number of selected receiver chains when the determined channel condition is below an enable-receive-diversity threshold 603 and the determined duration is longer than a receive-diversity-enable period threshold 604. The disable-receive-diversity threshold 601 corresponds to a stronger channel condition than a channel condition corresponding to the enable-receive-diversity threshold 603. As a result, the receiver 200 while being incorporated in a mobile station benefits from use of receive diversity when the condition for use of receive diversity is beneficial. The system resources are conserved. The disable-receive-diversity threshold, enable-receive-diversity threshold, receive-diversity-enable period, and receive-diversity-disable-period may be chosen by the receiver, or may be communicated to the receiver by the transmitter. The duration of the receive-diversity-enable-period and the receive-diversity-disable period may be chosen appropriately to avoid frequent switching between different degrees of receiver diversity when frequent switching may be undesirable.

Figure 8:
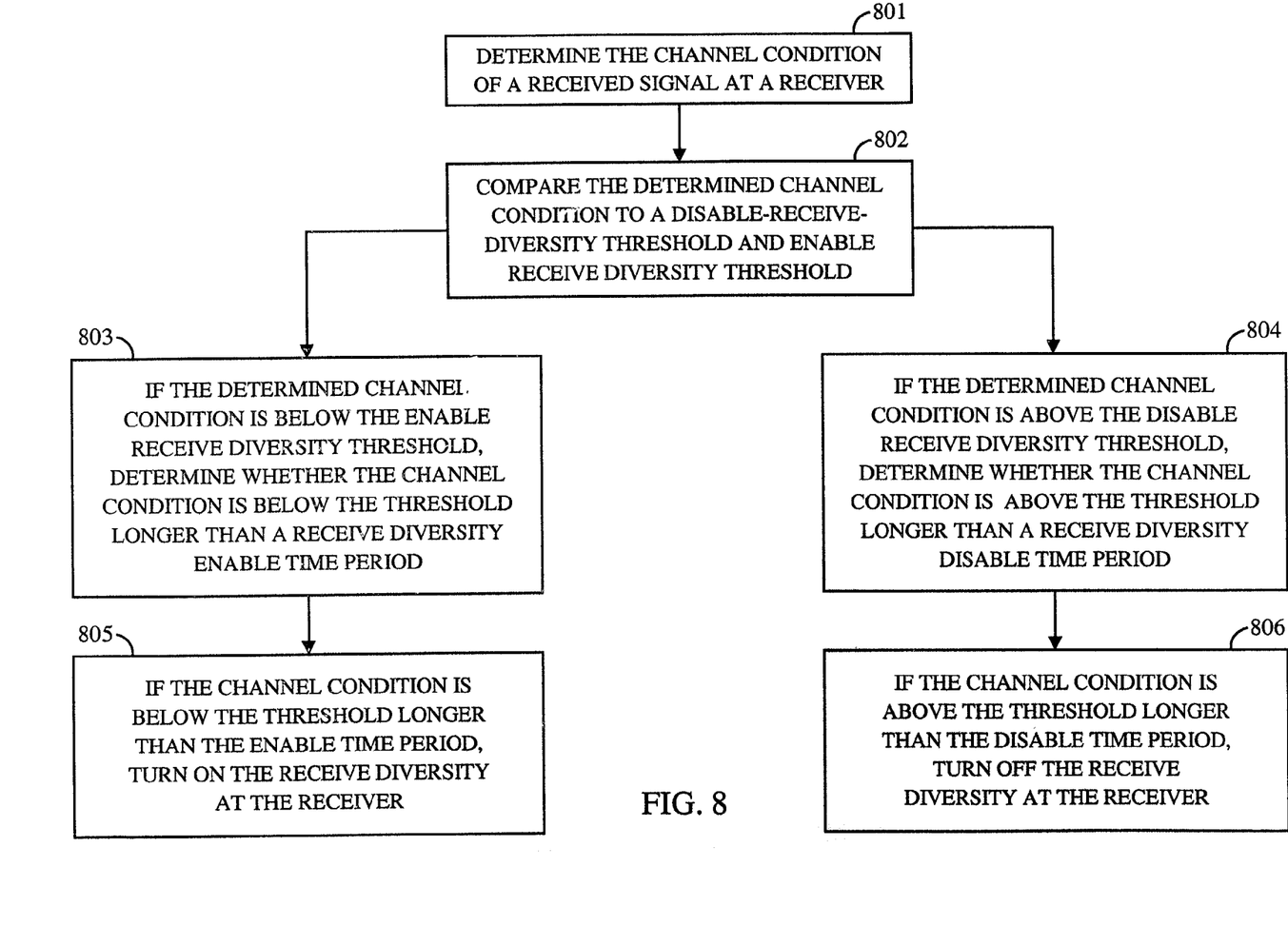
FIG. 8 illustrates a chart for comparison of the receive channel to various thresholds in accordance with various embodiments of the invention.

Referring to FIG. 8, a flow chart for determining receive diversity in a receiver in accordance with various aspects of the invention is shown. At step 801, the channel condition of a receive signal at a receiver is determined. The parameter for determining the channel condition may be the Ec/Io or any other related parameter associated with the received signal. At step 802, the determined channel condition is compared to disable receive diversity threshold 601 and enable receive diversity threshold 603. At step 803, if the determined channel condition is below the enable receive diversity threshold 603, the control system 210 or processor 401 may determine whether the channel condition is below the threshold 603 for a duration longer than the receive diversity enable time period 604. If the channel condition is below the threshold 603 longer than the enable time period 604, the control system 210 or processor 401 may turn on or increase the scale of the receive diversity at the receiver 200. At step 804, if the determined channel condition is above the disable receive diversity threshold 601, the control system 210 or processor 401 may determine whether the channel condition is above the threshold 601 for a duration longer than the receive diversity disable time period 602. If the channel condition is above the threshold 601 longer than the disable time period 602, the control system 210 or processor 401 may turn off or decrease the scale of the receive diversity at the receiver 200.

Figure 7:
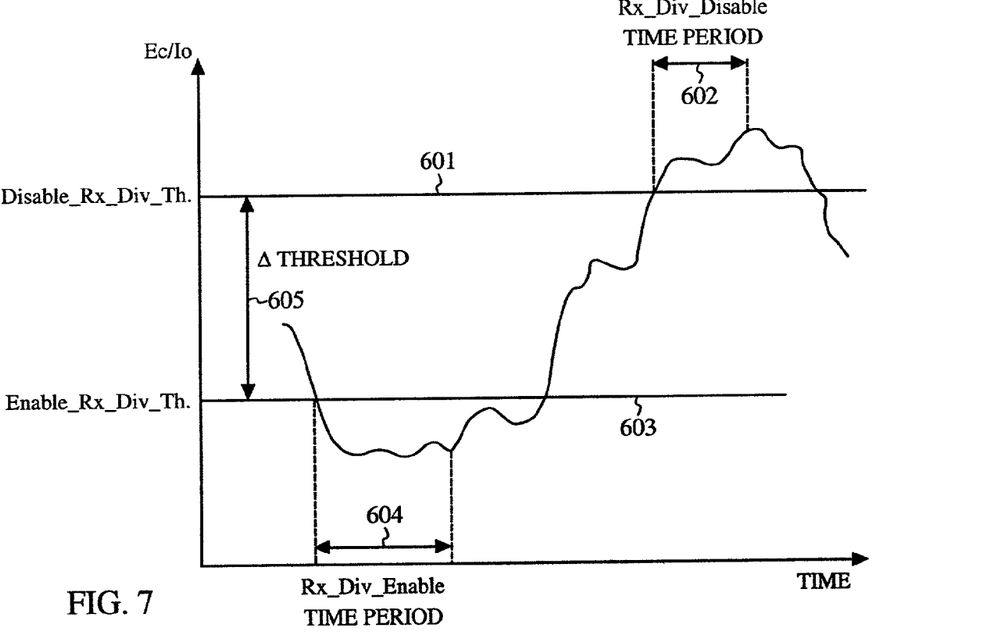
FIG. 7 illustrates comparison of the receive channel to various thresholds in accordance with various embodiments of the invention.

Furthermore, the control system is configured for adjusting a delta threshold 605 corresponding to a difference between the enable-receive-diversity threshold 603 and disable-receive-diversity threshold 601. The adjustment of the delta threshold 605 may be based on a mobility level of the receiver in the communication system. The receiver may be incorporated in a mobile station in the communication system 100. The control system is configured for increasing the delta threshold 605 in response to an increasing mobility level and reducing the delta threshold 605 in response to a decreasing mobility level.

In accordance with various aspects of the invention, the enable-receive-diversity threshold 603 and disable-receivediversity threshold 601 may be based on various system parameters. The channel condition may be measured using either the Ec/Io of the pilots transmitted by the transmitters in the receiver's Active Set, or the Ec/Io of the strongest pilot signal, or the total received power at the receiver, or the FER experienced by the receiver, etc. A combination of the above measures of channel condition may be used.

For example, if the Ec/Io of the strongest pilot is high, and the received power is high, the receiver may decide to scale down the degree of receiver diversity. On the other hand, if the received power is high, but the Ec/Io of the strongest pilot is low, the receiver may decide to increase the degree of receiver diversity. Similarly, if the FER is low, the receiver may reduce the degree of receiver diversity either irrespective of the values of the other measures, or in combination with the values of other measures. The measure of channel condition to use, and the thresholds for increasing or reducing the degree of receiver diversity may be chosen by the receiver on its own, or may be communicated to the receiver by the transmitter.

The system capacity may be based on several factors. For example, the system capacity may be based on the total transmit power that a base station is allowed to transmit. The number of codes available for use on traffic channels is also another important factor. When the demand for use of the system is increased, a large number of available codes may be used, and leaving few codes for adding new traffic channels. Similarly, when the demand for use of the system is increased, the transmit power increases to near the total allowed transmit power. Under such a condition, new channels may not be added due to lack of available power. However, when a receiver is using receive diversity, the required transmit power level is lower than the level required for reception without use of diversity.

In accordance with various aspects of the invention, for determining receive diversity in a communication system, a control system, such as a base station controller incorporated in a base station, determines a demand level for use of communication resources in the communication system (100). A transmitter, such as transmitter 300, communicates a message indicating use of receive diversity at a mobile station. The message is based on the determined demand level. The demand level may be measured in respect to the available transmit power level, the number of codes available for allocation or a combination of factors. The message may be transmitted on a common or dedicated channel to the mobile station. The message may indicate at least one of reducing a scale, turning off, turning on and increasing scale of receive diversity at the mobile station. The message may indicate at least one of reducing a scale and turning off use of receive diversity at the mobile station when the demand level is lower than a predetermined level. As such, the receiver may conserve battery power since the transmitter may transmit at a higher power level due to low demand. The message may indicate at least one of increasing scale and turning on use of receive diversity at the mobile station when the demand level is higher than a predetermined level. As such, the receiver may require a lower transmit power level after turning on or increasing the scale of receive diversity. As a result, the receiver may feedback the need for a lower transmit power. The total transmit power is then reduced, leaving additional available power for responding to the increased system demand level.

Generally stated, the base station may be selected to communicate various thresholds to the mobile station for effecting a control over use of receive diversity at various mobile stations operating in the coverage area. Therefore, the base station and the mobile stations may incorporate various ways for communication of at least one of the disable-receive-diversity threshold, receive-diversity-disable period threshold, enable-receive-diversity threshold and receive-diversity-enable period threshold. Moreover, the base station may also select which parameter, such Ec/Io or FER, for determination of the channel condition.

The determination to use diversity and to what scale may also be based on other similar factors or a combination of similar factors. Moreover, the parameter Ec/Io is an indication of the carrier strength over interference. Other similarly indicating parameters may also be used for determining the level of diversity. For example, the factor "Ec" may be used instead of Ec/Io without deviating from the spirit of invention. The sum of the Ec/Io of all pilots in the receiver's Active Set may be used instead of the Ec/Io of the strongest pilots. Alternately, the sum of the Ec/Io of the paths that the receiver is demodulating may be used instead. The parameter may be filtered to reduce noise before being used to make decisions about increasing or reducing the level of receiver diversity. When the receiver uses multiple antennas, the Ec/Io at the multiple antennas may be averaged before comparing it to the thresholds. Those of skill in the art would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

The invention claimed is:

1. An apparatus for determining receive diversity in a communication system, comprising:
   a control system for determining a demand level associated with system capacity of said communication system; and
   a transmitter for communicating a message indicating use of receive diversity at a mobile station, said message based on said determined demand level, wherein said message indicates at least one of reducing a scale, turning off, turning on and increasing scale of receive diversity at said mobile station.

2. An apparatus for determining receive diversity in a communication system, comprising:
   a control system for determining a demand level associated with system capacity of said communication system; and
   a transmitter for communicating a message indicating use of receive diversity at a mobile station, said message based on said determined demand level, wherein said message indicates at least one of reducing a scale and turning off use of receive diversity at said mobile station when said demand level is lesser than a predetermined level.

3. An apparatus for determining receive diversity in a communication system, comprising:
   a control system for determining a demand level associated with system capacity of said communication system; and
   a transmitter for communicating a message indicating use of receive diversity at a mobile station, said message based on said determined demand level, wherein said message indicates at least one of increasing scale and turning on use of receive diversity at said mobile station when said demand level is higher than a predetermined level.

4. A method for determining receive diversity in a communication system, comprising:
   determining a demand level associated with system capacity of said communication system;
   communicating a message indicating use of receive diversity at a mobile station in said communication system, said message based on said determined demand level; and
   determining, for indication by said message, at least one of reducing a scale, turning off, turning on and increasing scale of receive diversity at said mobile station.

5. A method for determining receive diversity in a communication system, comprising:
   determining a demand level associated with system capacity of said communication system;
   communicating a message indicating use of receive diversity at a mobile station in said communication system, said message based on said determined demand level; and
   determining, for indication by said message, at least one of reducing a scale and turning off use of receive diversity at said mobile station when said demand level is lower than a predetermined level.

6. A method for determining receive diversity in a communication system, comprising:
   determining a demand level associated with system capacity of said communication system;
   communicating a message indicating use of receive diversity at a mobile station in said communication system, said message based on said determined demand level; and
   determining, for indication by said message, at least one of increasing scale and turning on use of receive diversity at said mobile station when said demand level is higher than a predetermined level.

7. An apparatus for determining receive diversity in a communication system, comprising:
   a receiver, including a plurality of receiver chains, for receiving a channel and determining a channel condition of said channel and duration of said channel condition; and
   a control system for controlling receive diversity of said receiver by selecting a number of said plurality of receiver chains based on said determined channel condition and said duration.

8. The apparatus as recited in claim 7 wherein said control system is configured for reducing said number of selected receiver chains when said determined channel condition is above a disable-receive-diversity threshold and said determined duration is longer than a receive-diversity-disable period threshold.

9. The apparatus as recited in claim 7 wherein said control system is configured for increasing said number of selected receiver chains when said determined channel condition is below an enable-receive-diversity threshold and said determined duration is longer than a receive-diversity-enable period threshold.

10. The apparatus as recited in claim 7 wherein said control system is configured for reducing said number of selected receiver chains when said determined channel condition is above a disable-receive-diversity threshold and said determined duration is longer than a receive-diversity-disable period threshold and increasing said number of selected receiver chains when said determined channel condition is below an enable-receive-diversity threshold and said determined duration is longer than a receive-diversity-enable period threshold, and wherein said disable-receive-diversity threshold corresponds to a stronger channel condition than a channel condition corresponding to said enable-receive-diversity threshold.

11. The apparatus as recited in claim 10 further comprising means for communication, between a base station and a mobile station, of at least one of said disable-receive-diversity threshold, said receive-diversity-disable period threshold, said enable-receive-diversity threshold and said receive-diversity-enable period threshold.

12. The apparatus as recited in claim 10 wherein at least one of said disable-receive-diversity threshold, said receive-diversity-disable period threshold, said enable-receive-diversity threshold, and said receive-diversity-enable period threshold is communicated to said receiver.

13. The apparatus as recited in claim 7 wherein said control system is configured for adjusting a delta threshold corresponding to a difference between said enable-receive-diversity and disable-receive-diversity thresholds based on a mobility level of said receiver in said communication system.

14. The apparatus as recited in claim 13 wherein said control system is configured for increasing said delta threshold in response to an increasing mobility level and reducing said delta threshold in response to a decreasing mobility level.

15. A method for determining receive diversity in a communication system, comprising:
   determining a channel condition of a channel received at a receiver, including a plurality of receiver chains, and duration of said channel condition; and
   controlling receive diversity of said receiver by selecting a number of said plurality of receiver chains based on said determined channel condition and said duration.

16. The method as recited in claim 15 further comprising:
   reducing said number of selected receiver chains when said determined channel condition is above a disable-receive-diversity threshold and said determined duration is longer than a receive-diversity-disable period threshold.

17. The method as recited in claim 15 further comprising:
   increasing said number of selected receiver chains when said determined channel condition is below an enable-receive-diversity threshold and said determined duration is longer than a receive-diversity-enable period threshold.

18. The method as recited in claim further comprising:
   reducing said number of selected receiver chains when said determined channel condition is above a disable-receive-diversity threshold and said determined duration is longer than a receive-diversity-disable period threshold and increasing said number of selected receiver chains when said determined channel condition is below an enable-receive-diversity threshold and said determined duration is longer than a receive-diversity-enable period threshold, wherein said disable-receive-diversity threshold corresponds to a stronger channel condition than a channel condition corresponding to said enable-receive-diversity threshold.

19. The method as recited in claim 18 wherein at least one of said disable-receive-diversity threshold, said receive-diversity-disable period threshold, said enable-receive-diversity threshold, and said receive-diversity-enable period threshold is communicated to said receiver.

20. The method as recited in claim 18 further comprising communicating, between a base station and a mobile station, at least one of said disable-receive-diversity threshold, said receive-diversity-disable period threshold, said enable-receive-diversity threshold and said receive-diversity-enable period threshold.

21. The method as recited in claim 18 further comprising:
   adjusting a delta threshold corresponding to a difference between said enable-receive-diversity and disable-receive-diversity thresholds based on a mobility level of said receiver in said communication system.

22. The method as recited in claim 21 further comprising:
   increasing said delta threshold in response to an increasing mobility level and reducing said delta threshold in response to a decreasing mobility level.

23. A computer readable medium embodying instructions executable by a processor to perform a method comprising:
   determining a demand level associated with system capacity of a communication system; and
   communicating a message indicating use of receive diversity at a mobile station, said message based on said determined demand level, wherein said message indicates at least one of reducing a scale, turning off, turning on and increasing scale of receive diversity at said mobile station.

* * * * *